United States Patent [19]

Svanteson

[11] 3,807,431

[45] Apr. 30, 1974

[54] DEVICE FOR CONDUCTING WASTE LIQUID FROM A RECEPTACLE TO A PNEUMATIC LIQUID DISPOSAL SYSTEM

[75] Inventor: Sven Elis Ake Svanteson, Bromma, Sweden

[73] Assignee: Aktiebolaget Electrolux, Stockholm, Sweden

[22] Filed: Nov. 21, 1972

[21] Appl. No.: 308,510

[30] Foreign Application Priority Data

Aug. 25, 1972 Switzerland.................... 11064

[52] U.S. Cl.................. 137/205, 137/578, 137/4 B
[51] Int. Cl............................................. E03d 1/00
[58] Field of Search .......... 137/578, 205, 412, 413; 4/1, 10, 77; 210/123, 258, 259

[56] References Cited
UNITED STATES PATENTS

| 3,686,693 | 8/1972 | Lijendahl | 137/205 |
| 2,045,442 | 6/1936 | Couch | 210/123 |
| 3,633,218 | 1/1972 | Lekberg | 137/578 |

*Primary Examiner*—Alan Cohan
*Attorney, Agent, or Firm*—Alfred W. Miller

[57] ABSTRACT

An apparatus for conveying waste liquid from a holding receptacle to a vacuum sewage disposal system in which the waste liquid is conducted through a transport conduit. In this arrangement, the transport conduit is provided with a means for providing a suitable admixture of atmospheric air to the waste liquid being conveyed at the inlet end of the transport conduit in order to obtain greater efficiency in the conveyance of the liquid.

7 Claims, 4 Drawing Figures

PATENTED APR 30 1974
3,807,431
SHEET 3 OF 3
FIG. 3
FIG. 4
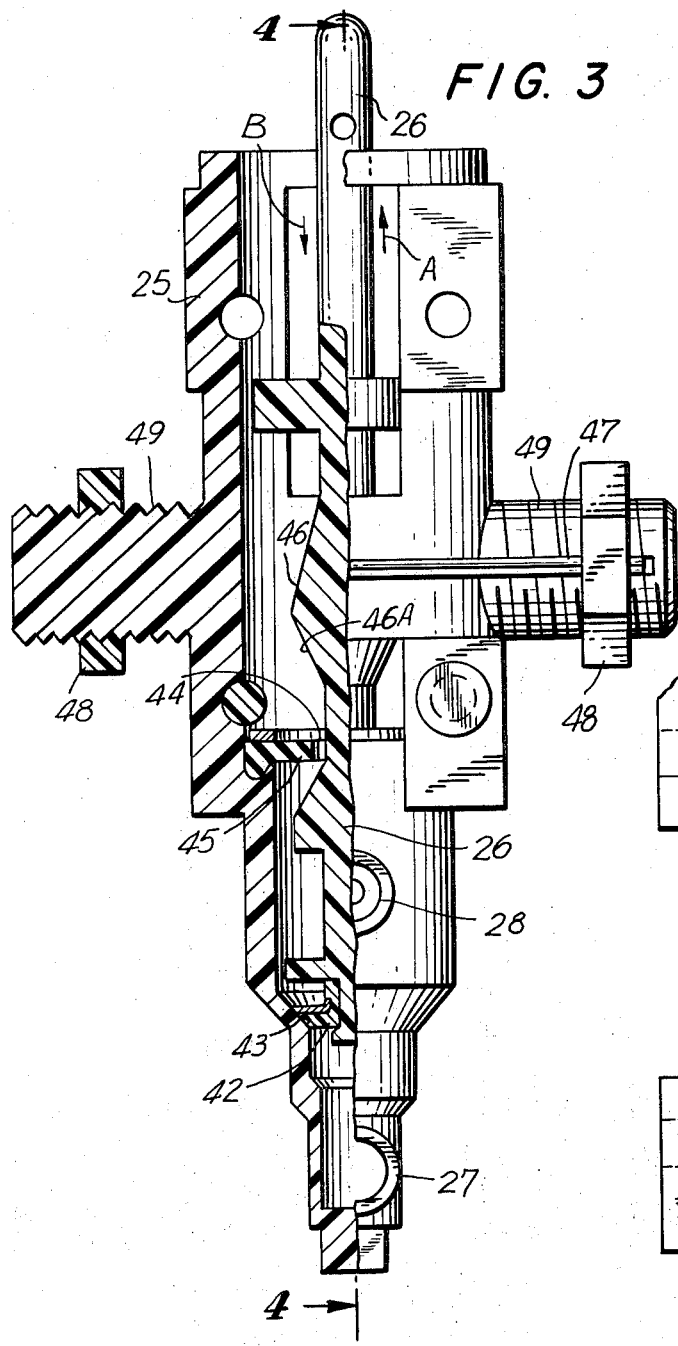
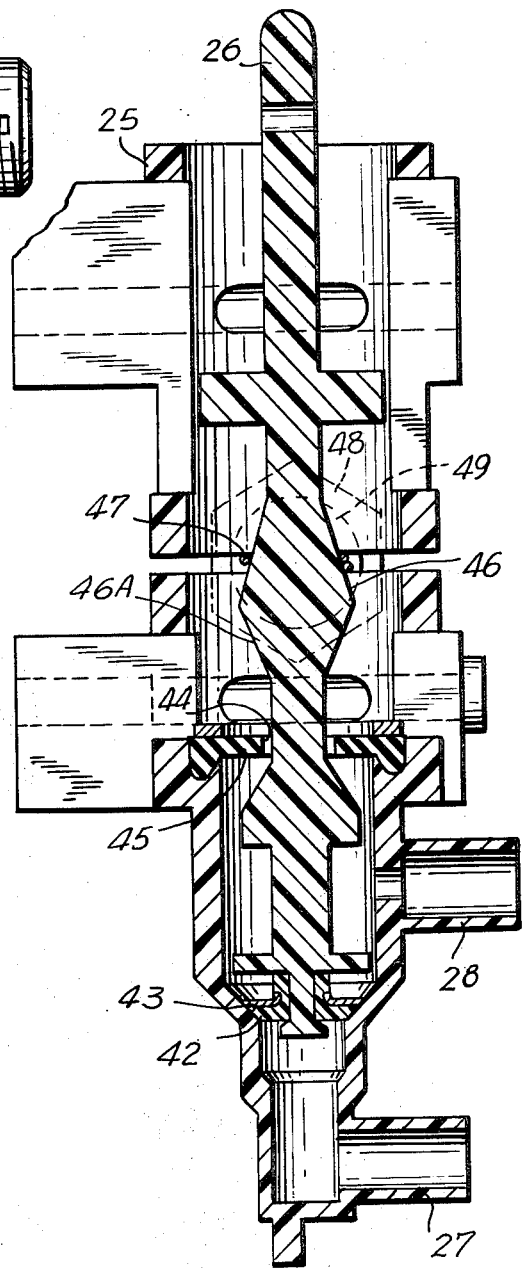

DEVICE FOR CONDUCTING WASTE LIQUID FROM A RECEPTACLE TO A PNEUMATIC LIQUID DISPOSAL SYSTEM

BACKGROUND OF THE INVENTION

In pneumatic sewage systems for waste liquid, for example sewer water, the liquid is conveyed through a long conduit and since there are different levels of height between the conduit portions, very often there is not sufficient vacuum in the system to raise the liquid to a height which corresponds to the sum of the level differences in the long conduit.

The inlet to the holding receptacle is generally located so far down in the receptacle that it is well below the lowest level of the liquid in the receptacle. If it is desired to increase the capacity of the conduit connected to the receptacle by mixing air with the liquid being conveyed, the greatest efficiency is obtained if the air is mixed with the liquid at the inlet end of the conduit. However, it is not possible simply to lead an air hose down through the liquid to the inlet end since the air hose would fill with liquid when there is no liquid transport in the conduit. Cosequently, when the liquid in the conduit is water moved, it is not possible to mix air with the liquid being conveyed.

It is an object of the present invention to provide air mixed with the liquid at the inlet of the transport conduit whereby the vacuum present in the system can raise the liquid to a considerably higher level. This occurs because a liquid column in a rising conduit will have a lower specific weight and may be considered equivalent to a considerably shorter liquid column.

A further object of the present invention is to provide a structural arrangement in which a suitable admixture of air to the liquid being conveyed can be made to the inlet end of the transport conduit. The end result is that the specific inlight of the total liquid column is reduced and the column can be raised without difficulty by the available vacuum in the system. The liquid column being raised passes through a suction conduit having one end immersed in the liquid collected in the receptacle and the other end connected to the transport conduit. The end immersed in the liquid is provided with a float, or other similar level sensing device, and has an opening adjacent thereto but above the float and out of the liquid. A valve arrangement is inserted in the liquid conveying conduit that is operatuvely connected to the float. Thus, the level changes of the liquid collected in the receptacle are sensed by means of a float, or the like, and the admission of air to the liquid being conveyed is regulated directly as a result of the level changes.

Another object of the present invention is to provide co-acting valves which respond to liquid level changes but permit the admission of air to be made at the inlet of the liquid transport conduit where it is most effective for smooth liquid flow through the system.

It is another object of the present invention to provide a device conducting waste liquid from a receptacle to a vacuum sewage system which can be connected to conventional gravity flow toilet and waste water systems.

The invention wlll now be more fully described with reference to the accompanying drawings wherein:

FIG. 3 is a partial sectional and partial elevational view of the auxiliary valve; and FIG. 4 is a sectional view of the auxiliary valve taken along the lines 4—4 of FIG. 3.

DESCRIPTION OF THE PREFERRED EMBODIMENT

Figure 1:
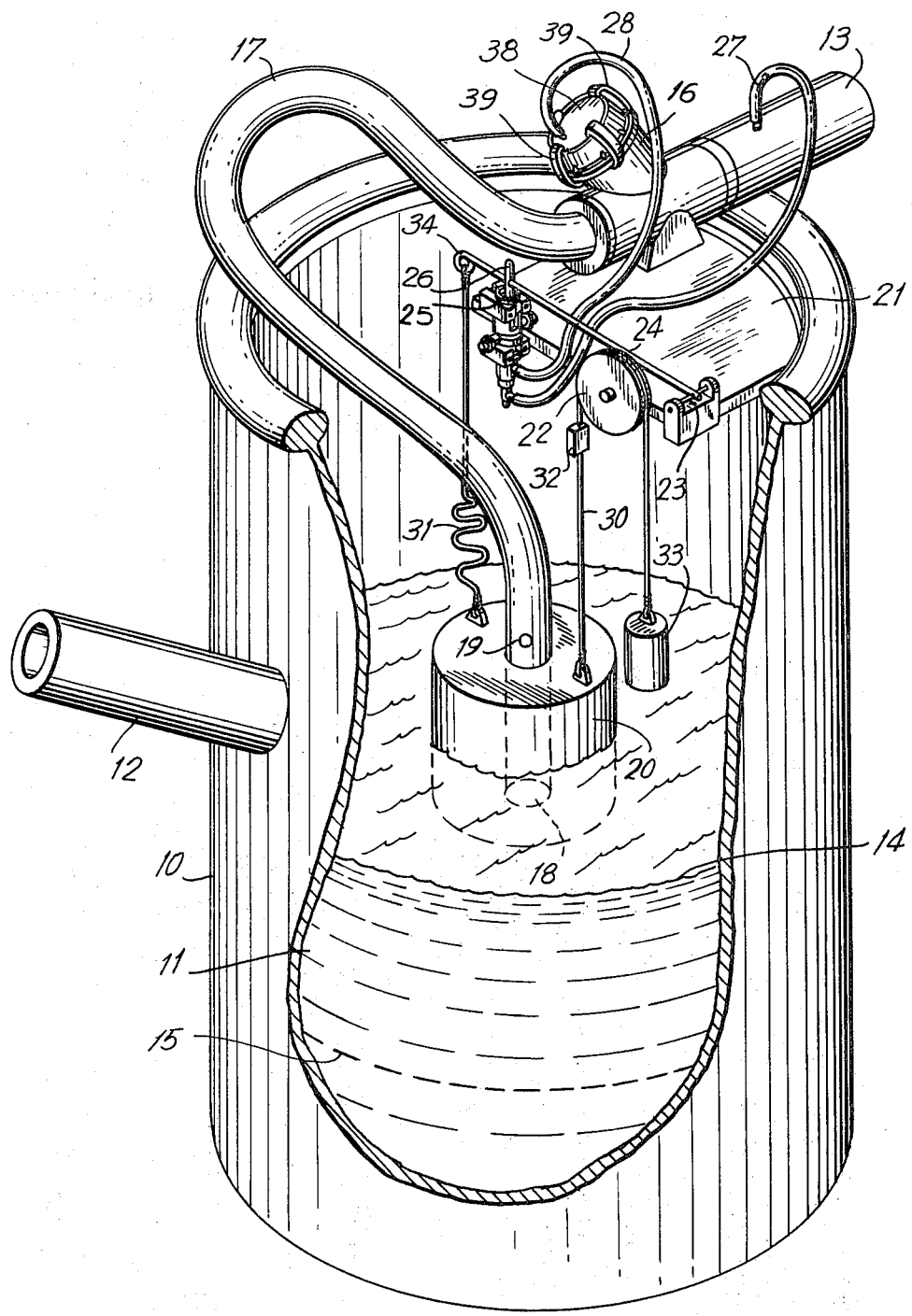
FIG. 1 is a perspective view, with a partial cut-away, of the apparatus for conveying waste liquid from a holding receptacle to a vacuum sewage disposal constructed in accordance with the teachings of the present invention.

The holding receptacle 10, as seen in FIG. 1, contains a liquid 11. An inlet tube 12 is shown connected to the receptacle for supplying the liquid 11 thereto from various sanitary conveniences, such as sinks and water closets. A transport conduit 13, which is under vacuum, is illustrated through which the liquid can be conveyed from the receptacle 10. The liquid level in the receptacle 10 changes and is indicated by the reference numeral 14. However, when the liquid in the receptacle reaches a level somewhat above the level 14, the transport conduit 13 is operatively connected to the liquid so that the liquid 11 is conveyed away from the receptacle 10.

In order to convey the liquid 11 from the receptacle 10 to the transport conduit 13, the latter is connected through a main valve 16 to a flexible suction conduit 17. The inlet end 18 of the flexible suction conduit 17 is immersed in the liquid 11 and furthermore the inlet end 18 is provided with an air admission hole 19 which is located slightly above the float 20, the latter being secured to the same inlet end 18 of the conduit 17. It should be noted that the float 20 follows the liquid level during its changes in height and ensures that the air admission hole 19 is always relatively near the liquid level 14. As seen in FIG. 1, when the liquid 11 has sunk to its lowest level 15, the transport of liquid through the flexible conduit 12 ceases.

Figure 2:
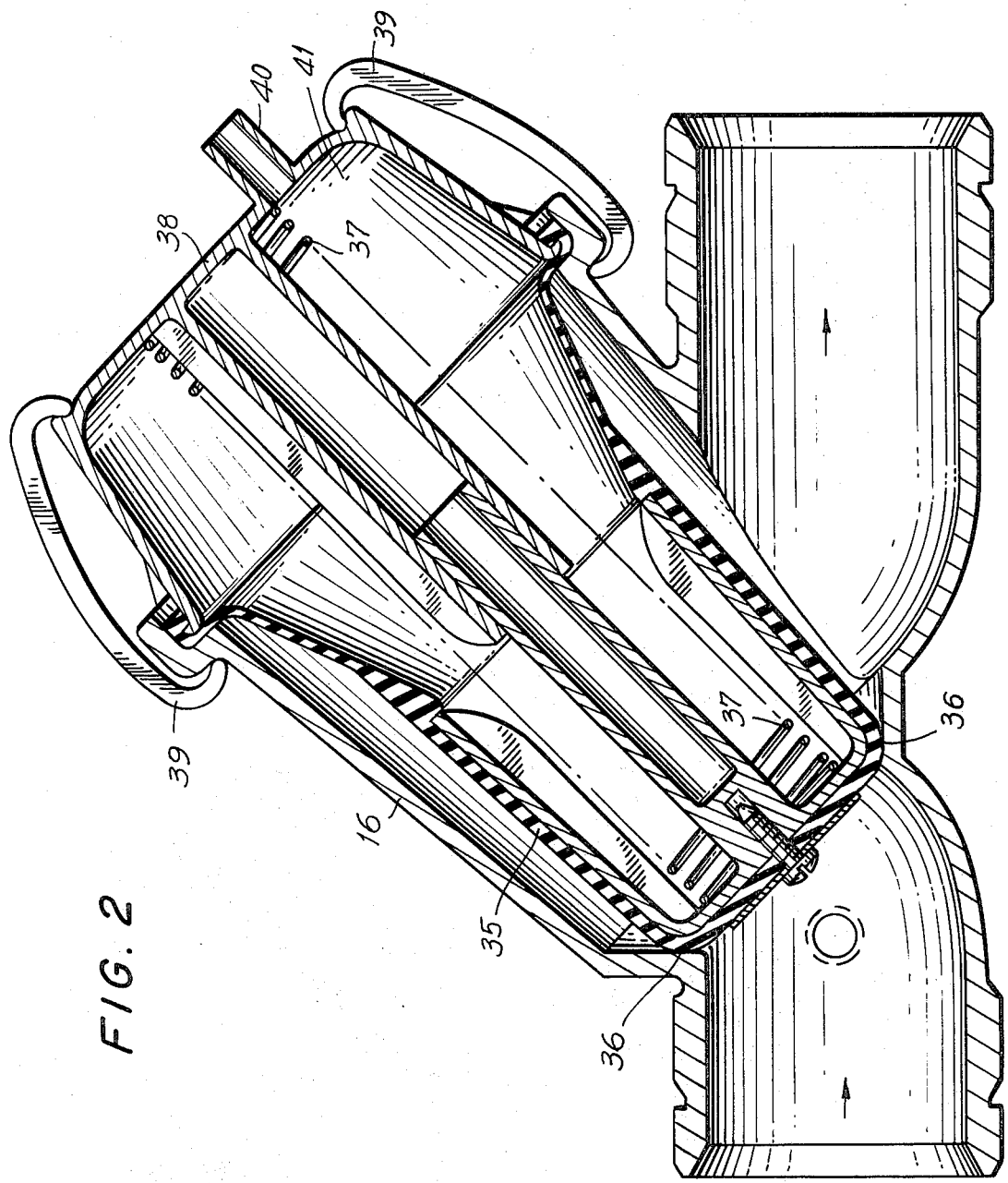
FIG. 2 is a sectional view of the main valve.

Referring to FIG. 2, the main valve 16 is shown provided with a flexible diaphragm 35 normally held against the valve seat 36 by the force of spring 37. A valve cover 38 is illustrated for enclosing the valve 16 and is held in place by the removable, frictionally engaging holders 39, and the valve cover 38 is further shown provided with an inlet connection 40 through which a vacuum is applied to the chamber 41 under the cover 38. When the aforesaid vacuum is applied to the valve 16, the flexible diaphragm 35 is drawn up by vacuum from the valve seat 36 against the force of spring 37 thereby enabling the valve 16 to open and liquid to flow in the direction of the arrows. The valve 16 will be closed when air of higher pressure, such as atmospheric air, passes through the inlet connection 40 into the chamber 41 and the diaphragm reseats itself on the valve seat 36. As seen in FIG. 1, the valve 16 is fixed on a shelf 21 secured to the upper wall of the receptacle 10. This shelf has a pulley 22 mounted thereon as well as a pivot 23 having a lever arm 24 connected thereto. In addition, an auxiliary valve 25 is positioned on the shelf 21 provided with an operating arm 26 that is operatively connected to the lever arm 24.

The auxiliary valve 25 with operating arm 26 is shown in greater detail in FIGS. 3 and 4, where the valve is illustrated in a closed position. In that position, a rubber sealing ring 42 on the operating arm 26 is drawn by vacuum against the valve seat 43 and atmospheric air passes to the main valve 16 through the central hole 44 of the rubber sealing ring 45 and conduit 28. When the auxiliary valve 25 is opened by movement of the operating arm 26 in the direction of the arrow A, the enlargement 46 of the operating arm 26 first engages and then moves past the leaf spring 47. Thereafter, the rubber sealing ring 42 is pulled away from its corresponding valve seat 43 and the valve 25 opens. When this occurs, the rubber sealing ring 45, having the relatively large central hole 44, is drawn by vacuum against the sloping surfaces 46A of the enlargement 46 of the operating arm 26. With valve 25 open, vacuum from the transport conduit 13 is applied through the conduit 27, the valve 25, conduit 28 to the inlet 40 of the main valve 16.

When it is desired to close the auxiliary valve 25, a force is applied to the operating arm 26 in the direction of the arrow B and the rubber sealing ring 45 will be maintained as a seal by the vacuum on the sloping surfaces 46A. This condition will continue until the operating arm 26 snaps past the spring 47 and the rubber ring 42 once again is seated against its valve seat 43 and atmospheric passes to the main valve 16.

The tension of the spring 47, as seen in FIG. 3, may be adjusted by means of adjustable nuts 48 on the threaded stub shafts 49.

It should be noted that the inlet tube 12 of the receptacle 10 is connected to sanitary conveniences (not shown) of homes or buildings, and the waste liquid therefrom is led in the usual manner to the receptacle 10 for eventual conveyance to a pneumatic liquid disposal system.

It should be apparent that the auxiliary valve 25 is so constructed that the operating arm 26 can snap into two positions, that is, an upper position and a lower position. When the operating arm 26 has assumed its upper position, a vacuum from the transport conduit 13 is connected through the conduits 27 and 28 to the chamber 41 of the main valve 16. Since a vacuum is applied to the chamber 41, the diaphragm 35 is drawn off the valve seat 36 and the main valve 16 opens. When the operating arm 26 snaps back into its lower position, as shown in FIG. 3, the vacuum connection is shut off and consequently the main valve 16 is closed.

Referring again to FIG. 1, the float 20 acts on the lever 24 and consequently the operating arm 26 by means of ropes or cables 30 and 31, both being connected at one of their ends to the float. The rope 30 passes over the pulley 22 mounted on the shelf 21 and is provided with a shoe 32 and a weight 33. As a result of this arrangement, if the float 20 moves upwardly, the shoe 32 will also move upwardly due to the weight 33 and will pass between the pulley 22 and the lever arm 24, the latter normally resting on the pulley. When this occurs, the lever arm 24 will be elevated and consequently, the operating arm 26 will snap into its upper position, with the lever arm remaining in its lifted position. However, the outer end 34 of the lever arm 24 is connected to the other end of rope 31 which in the lifted position of the lever arm 24 is slack, but when the float 20 moves sufficiently downwardly, the rope 31 is stretched thereby drawing the lever arm 24 downwardly so that the operating arm 26 snaps into its lower position.

The operation of the present invention is as follows:

Liquid is supplied to the holding receptacle 10 through the inlet tube 12 and as this occurs the liquid level 14 rises and the float 20 moves upwardly. When the liquid 11 reaches a predetermined level, the operating arm 26 will snap into its upper position thereby causing the auxiliary valve 25 to open. Vacuum is then supplied from a pneumatic liquid disposal system to the chamber 41 of the main valve 16, and the latter opens. The liquid 11 is then conveyed from the receptacle 10, under the influence of the vacuum, through the suction conduit 17, the liquid being mixed with air passing through the air admission hole 19 and into the conduit 17. The liquid 11 is further conducted through the main valve 16 and the transport conduit 13 to the pneumatic disposal system. When the liquid level decreases to the level 15, the rope 31 becomes taut and the operating arm 26 has snapped into its lower position. Thus, the auxiliary valve 25 and the valve 16 are closed and the transport of liquid out of the receptacle 10 ceases. The present arrangement results in a liquid holding receptacle in which the collection level can vary between an upper and lower level.

The shoe 32 can be constructed so that it is easily movable to selected positions along the rope 30 and the length of the rope 31 can be easily adjustable. In this manner, the highest and lowest levels of the liquid 11 in the collection receptacle 10 can be adjusted as desired.

What is claimed is:

1. An apparatus for conducting waste liquid from a receptacle to a pneumatic liquid disposal system by means of a transport conduit under vacuum, the improvement comprising a suction conduit having one end connected to the transport conduit and the other end immersed in the liquid collected in the receptacle, said other end of the suction conduit being provided with a hole located above the liquid level for the flowing of air with the liquid being conveyed, a device in the receptacle which follows the level changes of the liquid in the receptacle, and means operatively connected to the device for initiating the flow of waste liquid intermittently from the receptacle through the suction conduit in response to the accumlation of waste liquid in the receptacle, said other end of the suction conduit being secured to said device.

2. The apparatus as claimed in claim 1 wherein the device is a float.

3. The apparatus as claimed in claim 2 wherein the hole in the suction conduit is located adjacent to and above said float.

4. The apparatus as claimed in claim 1 wherein the suction conduit is a flexible hose.

5. The apparatus as claimed in claim 2 wherein said means comprises a main valve located in the suction conduit or the transport conduit, an operating device, means operatively connecting said float to the operating device, the latter being operatively connected to said main valve whereby the transport conduit is opened or closed depending on the position of the float on the liquid surface in the receptacle.

6. The apparatus as claimed in claim 5 wherein the main valve is operated by the vacuum present in the transport conduit, and further comprising an auxiliary valve which is acted upon by the operating device and by which the vacuum present in the transport conduit can be connected to or disconnected from said main valve.

7. The apparatus as claimed in claim 6 wherein the operating device comprises two ropes each connected at one end to the float, a lever arrangement, one of the ropes co-acting with the lever arrangement to open the auxiliary valve during an upward movement of the float, and the other rope being arranged to close the auxiliary valve during the downward movement of the float.

* * * * *